(12) United States Patent
Mölne et al.

(10) Patent No.: US 8,780,543 B2
(45) Date of Patent: Jul. 15, 2014

(54) INTEGRATED FEATURE FOR FRICTION-LESS MOVEMENT OF FORCE SENSITIVE TOUCH SCREEN

(75) Inventors: Anders L. Mölne, Cary, NC (US); David Griffith, Apex, NC (US); Mark Lackey, Raleigh, NC (US); Curtiss Noble, Holly Springs, NC (US)

(73) Assignee: F-Origin, Inc, Morrisville ( * ) Notice: Subject to any disclaimer, the term of this patent is extended or adjusted under 35 U.S.C. 154(b) by 301 days.

(21) Appl. No.: 13/425,846

(22) Filed: Mar. 21, 2012

(65) Prior Publication Data

US 2012/0200789 A1    Aug. 9, 2012

Related U.S. Application Data

(63) Continuation-in-part of application No. 12/450,138, filed as application No. PCT/US2008/003374 on Mar. 14, 2008, now Pat. No. 8,144,453.

(60) Provisional application No. 60/918,275, filed on Mar. 15, 2007.

(51) Int. Cl.
*G06F 1/16* (2006.01)
*H05K 5/00* (2006.01)
*H05K 7/00* (2006.01)

(52) U.S. Cl.
USPC .................... 361/679.21; 345/173; 349/60

(58) Field of Classification Search
CPC ................... G06F 3/0414; G02F 1/13338
USPC ................... 361/679.21; 345/173; 349/58–60
See application file for complete search history.

(56) References Cited

U.S. PATENT DOCUMENTS

| | | | | |
|---|---|---|---|---|
| 4,511,760 A | * | 4/1985 | Garwin et al. | 178/18.03 |
| 5,038,142 A | * | 8/1991 | Flower et al. | 341/34 |
| 5,808,707 A | * | 9/1998 | Niibori et al. | 349/60 |
| 6,879,318 B1 | * | 4/2005 | Chan et al. | 345/173 |
| 7,183,948 B2 | * | 2/2007 | Roberts | 341/34 |
| 7,379,128 B2 | * | 5/2008 | Tsubokura et al. | 349/60 |
| 2002/0175836 A1 | * | 11/2002 | Roberts | 341/34 |
| 2003/0206162 A1 | * | 11/2003 | Roberts | 345/173 |
| 2004/0108995 A1 | * | 6/2004 | Hoshino et al. | 345/173 |
| 2004/0156168 A1 | * | 8/2004 | LeVasseur et al. | 361/681 |
| 2008/0303797 A1 | * | 12/2008 | Grothe | 345/173 |
| 2009/0243817 A1 | * | 10/2009 | Son | 340/407.2 |
| 2011/0025631 A1 | * | 2/2011 | Han | 345/173 |
| 2011/0227872 A1 | * | 9/2011 | Huska et al. | 345/174 |

* cited by examiner

*Primary Examiner* — Adrian S Wilson
(74) *Attorney, Agent, or Firm* — Ober, Kaler, Grimes & Shriver; Royal W. Craig

(57) ABSTRACT

A suspension system for a differential-pressure touch sensitive panel suspended over force sensors, for use in either fixed or mobile devices such as point of sales terminals, kiosks, laptops, monitors, PDAs, cell phones, UMPCs and more. In one embodiment, a number of leaf springs are attached directly to the touch lens at both ends and attached directly to the underlying housing at the center, effectively pulling the leaf spring down at the center into a concave arc. The spring bias preloads the touch lens downward against the force sensors. The leaf springs bring the touch lens into a fixed state in the xy-plane and resist translation; however, the touch lens remains free to float against the bias of the leaf spring(s) without any frictional physical contact along the z-axis.

20 Claims, 3 Drawing Sheets

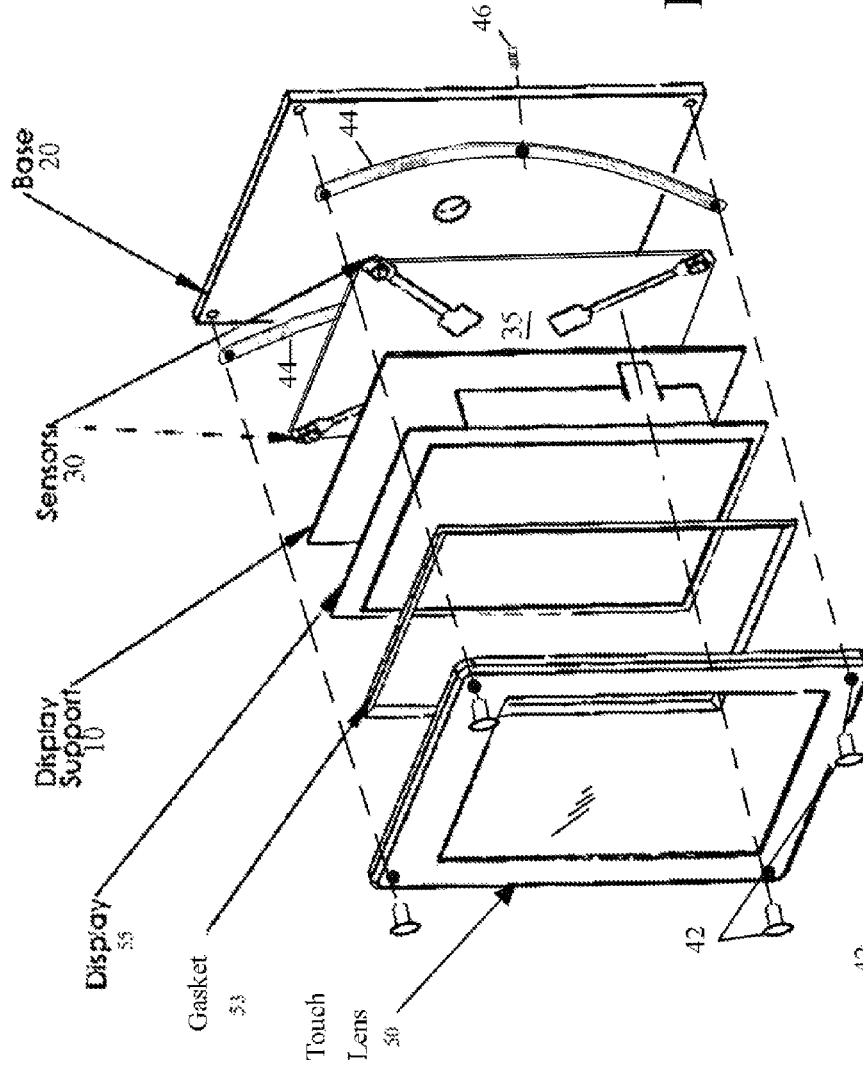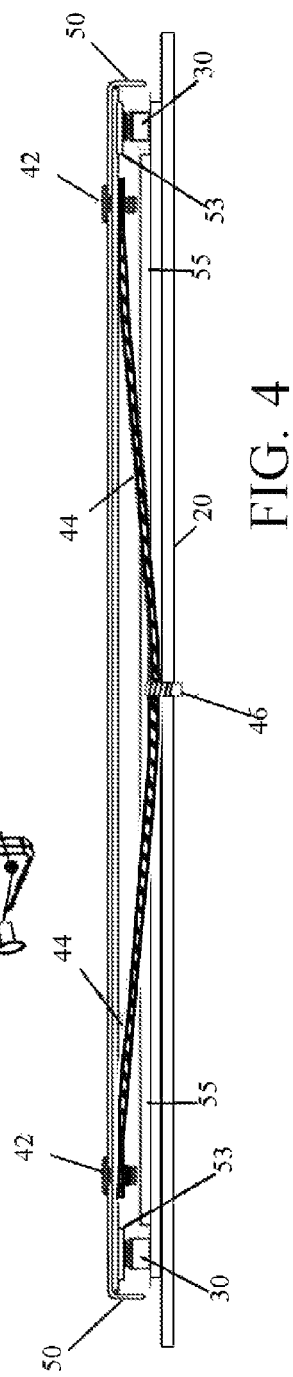

INTEGRATED FEATURE FOR FRICTION-LESS MOVEMENT OF FORCE SENSITIVE TOUCH SCREEN

CROSS-REFERENCE TO RELATED APPLICATION(S)

The present invention is a continuation-in-part of U.S. patent application Ser. No. 12/450,138 filed Sep. 11, 2009 now U.S. Pat. No. 8,144,453, which is a national phase entry of International Application PCT/US2008/003374 filed Mar. 14, 2008, which in turn claims priority based on U.S. Provisional Patent Application 60/918,275 filed 15 Mar. 2007.

BACKGROUND OF THE INVENTION (1) Field of the Invention

The present invention relates to mechanical touch input systems such as touch panels and touch screens used in fixed or mobile devices, such as point of sales terminals, kiosks, laptops, monitors, POS, POI, PDAs, cell phones, UMPCs and more, that require the touch component to be fully constrained in two directions (x & y), but requiring unencumbered freedom to translate in the third direction (z-direction).

(2) Description of Prior Art

The concept of using multiple force sensing sensors to register, measure and triangulate the touched position of a touch screen has been a known concept for more than twenty years, however, to produce a high quality touch screen solution has proven difficult.

Over the last few years the performance of force sensors has improved substantially and the component cost has been reduced to commercially viable prices. In addition, there has been software advances, creating an environment ready for high volume product implementations of touch screens based on force sensing. There is however still one major problem that must be overcome, the mechanical implementation.

For the typical force based touch screen implementation, the input device consists of a free standing touch screen lens or the actual LCD module. This touch screen lens rests on 3 or more force sensing sensors that are placed on a rear cover or some type of rigid surface, such as a PC Board or a back plane. The overall mechanical housing holds the different components in place as a system with different types of mounting mechanisms, which allow for movement in the lens, yet keeps the lens in place and pressed towards the force sensors. The force sensors signals are electrically connected, sometimes amplified, and converted from analog to digital so that sensor readings may be provided to the touch screen control software running on the device processor or on a separate micro controller. It should also be mentioned that most force sensors are designed to measure vertical forces and have minimal-to-no tolerance to measure forces accurately that are not applied exactly straight into the sensors measurement plane.

The mounting mechanism of the touch screen is an active part of the touch screen and refers to the way the top lens, which is used as an input device, and the sensors that measure the position and the amount of exerted force, are mounted on base plate. Until now, production of force based touch screen devices with high accuracy has been a challenge due to large errors in reading and interpreting the forces. The errors occur because the forces introduced by the mechanical devices are not countered sufficiently and very difficult to account for. For example, the lens needs to allow for micro movement in the z direction, but must be fixed in the xy-plane in order to not introduce side movement and to minimize side forces. The lens also needs to be pre-loaded to ensure that the touch screen lens always remains in contact with the force sensors, even if the unit is moving or being turned upside-down. Adding a pre-loading solution will also introduce non-linear forces that are difficult to correctly account for, especially since the direction of gravity is typically unknown.

For example, U.S. Pat. No. 4,511,760 to Garwin et al. issued Apr. 16, 1985 shows a force sensing data input device responding to the release of pressure force. The input surface is provided with a transparent faceplate mounted on force-sensing piezoelectric transducers. Preferably, four piezoelectric transducers are provided, one at each corner of a rectangular opening formed in the frame. To determine the point of application of force on the input surface, the outputs of the four transducers are first summed. To constitute a valid data entry attempt, the sum must exceed a first threshold while the user is pushing on the input surface. When the user releases his finger, a peak of the sum is detected, which is of opposite polarity from the polarity of the sum for the pushing direction. The individual outputs of the four sensors at the time that the peak of the sum occurs are used to calculate the point of application of the force. This mechanical construct is using spring clips to pre-load the sensors and to keep the mechanical assembly in place. These spring clips could theoretically minimize movement in xy-plane, but will provide non-linear additions to the total forces as the lens is touched since the spring loading force will change as the lens is pressed (and moved) in the z-plane. The position of the pre-loading springs will also add to the complexity since they are adding forces that bends the lens over the sensors.

U.S. Pat. No. 5,038,142 to Flower et al. (IBM) issued Aug. 6, 1991 shows a touch sensing display screen supported by stiff springs having essentially uniaxial freedom of motion. Strain gauge sensors are applied directly to the springs and a processer calculates the X, Y and Z coordinate information. This configuration is similar to the above-referenced Garwin patent inasmuch as it employs a basic spring construction for allowing movement in z-direction but restricting the xy-plane. Again there are likely a lot of uncontrollable forces.

U.S. Pat. No. 6,879,318 by Chan et al. issued Apr. 12, 2005 shows a touch screen mounting assembly for a liquid crystal display panel LCD including a bottom frame, a backlight panel seated in the frame and that has a plurality of pressure-sensitive transducers mounted thereon, a liquid crystal display panel, and a top frame for exerting pressure when mounted to the bottom frame such that a plurality of compressible springs biases the LCD panel towards the bottom frame when touched or contacted by a user. The bottom and top frame assembly with backlight panel are mounted therein on springs, with an overlying LCD panel. Spring loaded mounting screws will allow for movement in the z-plane and pre-loading, but non-linear forces from pre-loading as well as lens friction will be present.

U.S. Pat. No. 7,379,128 to Tsubokura et al. issued 17 Sep. 2004 discloses elastic spacers framing the corners of a liquid crystal display panel.

US Publication No. 20040108995 by Hoshino et al. shows a spring-biased cantilevered display suspension.

Two core problems have been identified in the foregoing references and other existing mechanical solutions for force based touch screens.

The first problem identified is the extremely small tolerances required for the mechanical build-up. The issue is, the touch screen needs to be extremely rigid because bending of the lens will result in part of the applied force being captured in the lens material or even lost to heat dissipation. Unfortunately, in making the sensor mounting surface as well as the lens (which rests on top of the sensor) extremely rigid, there is no longer any accommodation for mechanical tolerances. The sensor must fit the components exactly (within 1/100s of a mm), or else the lens will either not be in contact or must be forced down and be bent) through pre-loading. Due to the very small movement allowed within the force sensor and the use of rigid and parallel surfaces, keeping the top plate at the same distance and parallel to the base consistently, before and after the pressure is applied, remains a challenge both from a production as well as a measurement perspective.

The second core problem is the interference from other forces. Typical problems arise from non-linear forces, when there is contact and friction between the lens and other mechanical components, and from pre-loading, where the applied preloading creates non-linear additional forces as the lens is pressed down and some of the pre-loading forces are neutralized through the new and additional forces loading the lens towards the sensors. In addition, there may be bending in the materials, where some of the force is lost into side forces and heat.

These problems surface as the following symptoms:

1) Low accuracy: Approximately 1-10% of total distance between sensors in positioning error.

2) Repeating the same operation such as drawing a line, but starting from the opposite direction does not yield the same results (due to interference of lateral forces and/or actual side movement of lens transferred to the force sensors).

3) Greater amount of the touch force is required in order to compensate for the mounting mechanism's pushback forces.

4) Loss of sensitivity since a high minimum force (approximately >20 gf) is required in order to eliminate inaccuracies from non-linear forces from friction, pre-loading or material bending.

5) An elaborate mounting mechanism of the top plate is needed to keep the sensors flat. The mounting adds to the forces that interfere with the measurements.

6) Difference in positioning calculation that is different size and type of accuracy error, at different force levels.

Current precision instruments that incorporate precision bearing slide mechanisms try to offset the drag or friction when a shaft or feature is actuated through them. However, these parts can be somewhat bulky and pricey. In much more size constrained assemblies, or high volume manufacturing applications, a smaller or lower cost solution is needed.

It would be more advantageous to provide a suspension system for a touch-screen display that does not introduce any additional friction or non-linear forces to the touch screen system. It would also be desirable to reduce the dependency on extremely tight mechanical tolerances, allow for high volume automated production and use standard and/or low cost parts. Especially the tolerance issue is a common problem in the above-described prior art force-based touch screens, and it is, therefore, an objective of current invention to address these needs with a more efficient mechanical construction.

SUMMARY OF THE INVENTION

It is therefore an object of this invention to define and illustrate a mechanical suspension for a touch screen display/panel that does not add any, or only a minimal amount of additional non-linear forces to a touch screen system.

It is also an object of the present invention to provide a method and apparatus for providing frictionless translation ability in one direction, while constraining one or more parts from movement in the two other directions.

It is also another object to provide a frictionless motion translation mechanism for a variety of mechanical systems including touch screens that require components to be fully constrained in two directions (x & y), and yet require unencumbered freedom to translate in the third direction (z-direction).

It is still another object to provide a frictionless motion translation mechanism as described above that can be contained within the existing/standard low cost parts, and need not require the use of separate bearings or precision constraint parts.

Another important object of this invention is to reduce the dependency on extremely tight mechanical tolerances by pre-loading the sensor.

It is further an objective of this invention to define a mechanical system that is independent on touch surface material or design, where the touch screen may be a glass or plastic covered display, a metal touch surface or even a touch panel made from stone or wood.

In accordance with the foregoing objects, the present invention is a touch input comprising a touch lens suspended over force sensors by a new and innovative suspension mechanism, for use in either fixed or mobile devices such as point of sales terminals, kiosks, appliances, control panels, call buttons, touch switches, laptops, monitors, PDAs, cell phones, UMPCs and more. The suspension mechanism is scalable and can be varied in size and pre-loading pressure. The solution can also be manufactured at high volumes and at a low cost and is suitable for touch screen based products ranging from cellular phones and personal digital assistance up to computer monitors and plasma TVs/Monitors. The touch sensitive lens may also be either a separate touch lens made out of plastic or computer glass, or it may be the actual display module. For market segments, such as home appliances, the touch panel may be a metal front plate with etched keys or it may be a glass or metal panel replacing key assemblies in an elevator or on an ATM.

More specifically, the foregoing is accomplished by two single-leaf leaf spring attached directly to the touch lens at both ends/sides and attached directly to the underlying housing at the center, effectively pulling the leaf spring down at the center into a concave (top to bottom) arc. The spring bias preloads the touch lens downward against the force sensors, effectively pre-loading the force sensors. The leaf spring is attached at its center to the underlying housing by an adjustable set screw which can also allow for manual preset and adjustment of the preload force applied to the sensors, if so desired. Preferably, a pair of such leaf springs is used, each straddling one of two opposing sides of the touch lens so as not to obscure the LCD display. Alternatively, four such leaf springs may be used, each straddling one of the four polygonal sides of the touch lens. The leaf springs bring the touch lens into a fixed state in the xy-plane and resist translation there along, minimizing off-axis forces to the force sensors. However, the touch lens remains free to float against the bias of the leaf spring(s) without any frictional physical contact along the z-axis. As further described below, this suspension assembly ensures friction-free or close to friction-free movement in the z-plane (ensuring that touch forces are transferred directly to the force sensors) while locking the lens in the xy-plane and thereby ensuring no movement or introduction of unknown forces to the system. An important feature of the leaf spring is that this type of spring provides a very linear performance, allowing for simple adjustments or compensations in software if maximum touch screen accuracy is required.

For some products, a flexible padding between the rigid back plane and the sensor allowing the sensor to be further compressed, e.g., preloaded, which further reduces the dependency on extremely tight mechanical tolerances. This is not a required feature for all systems, but it allows for increased design flexibility for some touch system implementations.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 3 is an exploded assembly drawing of the touch screen system with leaf spring arm suspension according to the present invention.

FIG. 4 is a side cross-section of the touch screen system of FIG. 3.

DETAILED DESCRIPTION OF THE PREFERRED EMBODIMENTS

The present invention is a mechanical suspension for a touch screen display that does not add any additional non-linear forces to a touch screen system, and which preloads the touch screen sensor(s) to alleviate the need for extremely tight mechanical tolerances.

The mechanical suspension allows a touch sensitive display to be built using low-cost force sensors based on force sensing resistive material wherein the material's intrinsic resistance changes as a pressure is applied. Such sensors may include force-sensing resistive (FSR) sensors, piezo resistive sensors, or FTR (force transducing rubber). FTR is a polymer thick film (PTF) commonly used for keyboard applications.

Figure 1:
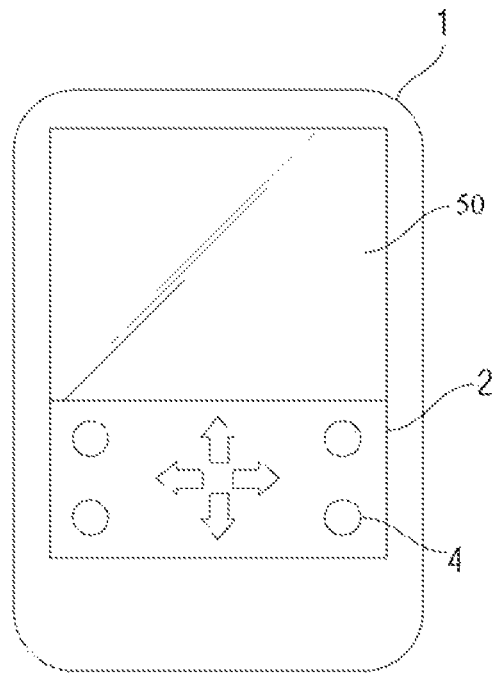
FIG. 1 is a high level representation of an electronic device 1, such as a PDA or a cellular phone.

The mechanical suspension is suitable for use in electronics devices such as shown in FIG. 1 which have a differential touch-sensitive force-sensing system including a touch lens 50 overtop an LCD display, including cell phones, PDAs, desktop phones, tablets, copy machines, or any other devices that use differential-pressure touch sensitive displays or panels including LCD, Organic Light-Emitting Diode (OLED) display screens or touch pad/touch lens systems.

Figure 2:
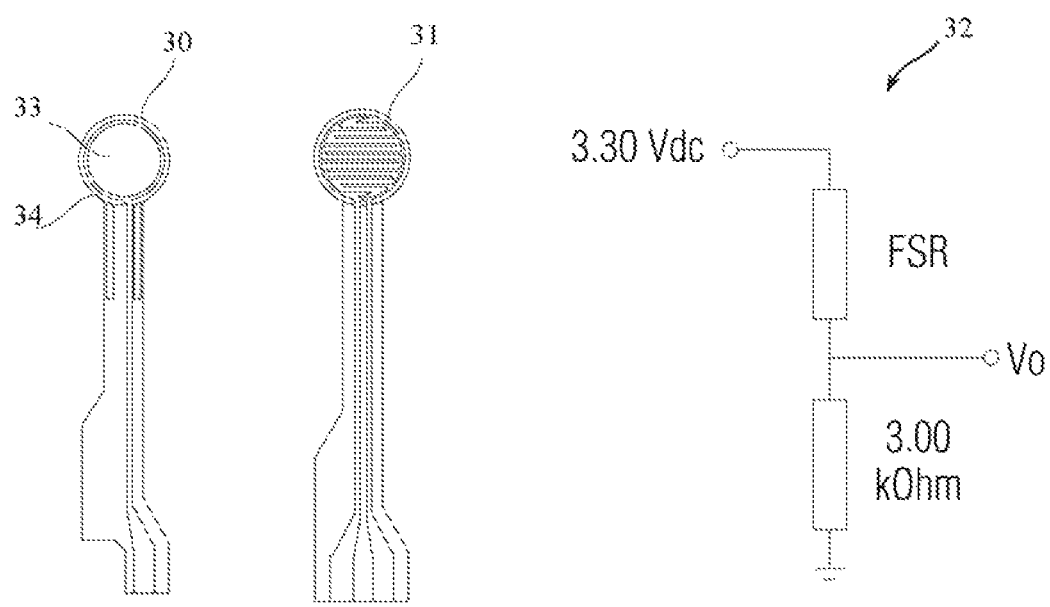
FIG. 2 illustrates two different embodiments of a typical sensor.

As seen in FIG. 2, the differential-pressure touch screen system uses a plurality of force sensors 30 (such as, for example, four) differentially-mounted sensors beneath the touch lens and all connected by traces or printed circuit board (PCB) to an electronic device processor, as disclosed in International application no PCT/US2007/019606 filed 7 Sep. 2007.

Two embodiments of FSR sensors are represented in FIG. 2. These sensors are typically made up of two plans of conductive materials 34 in sensor 30, or alternatively, conductive traces 31 in sensor 30 that are "connected" through FSR material. Different types of resistive materials may be used. The common characteristics of the FSR material are that it remains non-conductive until a force is applied. When a force is applied, the resistance in the material decreases as the applied force increases. Modular FSR sensors are commercially-available. In addition, for higher accuracy system, piezo resistive force sensors, such as the HFD-500 force sensor 30 available from HDK America, Inc.™ can be used. It comes in a small resin mold package with a 1/16 inch steel ball in contact with the silicon wafer (the piezo sensor). The HFD-500 Micro-Force Sensor can detect an applied force of well under 1 N. The single-axis device uses a piezo resistive sensor (crystal silicon sensor chip) that changes its resistance as a function of the pressure applied through the steel ball, creating a proportional output signal via internal bridge circuitry. Bridge resistance ranges from 7,000 to 11,000 W with an applied force from 0 to 5 N, and sensitivity is 20 mV/N with a linearity of ±3%.

The invention adapts a unique and different approach for mechanically connecting a touch screen lens 50 to the force sensors 30, and to also provide a pre-loading force against the sensors 30 with minimal non-linear changes over applied force pressure.

The illustrated embodiment of the present invention adheres to the following principles which are required for proper operation.

- Two opposing surfaces defined by the touch lens 50 and bottom plate 20 (such as the rear of the device housing) need to be flat and parallel.
- The touch lens 50 needs to touch the sensors 30 when at rest (non-touch mode), with or without pre-loading applied.
- The touch lens 50 needs to be free to move down towards the bottom plate when a force is applied on the top of it. Note that the actual movement is typically measured in hundredths of millimeters.
- The touch lens 50 needs to be fixed in the xy-plane, enough to eliminate frictional forces or side movements of the lens.
- Pre-loading must not introduce new non-linear forces to the system, especially from bending or twisting of the lens and/or the backplane.

FIG. 3 is an exploded perspective view of a touch screen system employing the foregoing principles, with a mechanical suspension according to the present invention. The illustrated embodiment employs four corner-mounted force sensors 30. The force sensors 30 may be affixed directly (surface-mounted) or indirectly (by traces as shown) to a sensor printed circuit board (PCB 35) which is in turn attached to an opposing base substrate 20 (which may be the back of a device housing). Alternatively, the force sensors 30 and sensor PCB 35 may be attached beneath an LCD display 55 or to an underlying display support substrate 10 as commonly used with LCD displays. In either case force sensors 30 reach around the LCD display 55 and underlying display support substrate 10 and bear against touch lens 50.

The touch lens 50 will typically be made out of computer glass or treated plastic, and may include a frame-like bezel as shown. The optional rubberized padding 53 may be placed as shown underlying the touch lens 50 and adhered thereto, and/or between the sensor printed circuit board (PCB 35 and the underlying housing 20. The padding 53 may be a continuous gasket made of Poron™ for example, which helps to eliminate the need for exact placement or for bending of the lens 50, as well as to provide additional spring-like preloading force to minimize the impact from shock and vibration. As an alternative to a continuous gasket, four individual corner-mounted pads may be used as padding 53. The maximum allowed movement, as allowed by the internal compression of the sensors 30 and the padding 53 is typically between 0.01-0.3 mm, but may be larger depending on sensor type, padding material and operational force range. Each force sensor 30 may comprise a conventional piezo-resistive force sensor as described above with or without a detent steel bearing or other force carrier, mounted therein to channel the force to the internal piezo membrane, where the applied force can be detected and measured.

The force sensors 30 may be any suitable piezo resistive force sensors such as HDK™ HFD-500 force sensors available from HDK America, Inc., with integral steel ball. However, any other suitable force sensor, such as for example, Force Sensing Resistive (FSR) force sensors or force-transducing-rubber (FTR) or capacitive force sensors may also be used.

Given a plurality (such as, for example, four) differentially-mounted force sensors 30, each sensor 30 registers a different force as a function of the two-dimensional (x, y) coordinates along the plane of the lens 50. By calculating the differential pressure at the corners the exact coordinate of the actual touch can be calculated.

FIG. 4 is a side cross-section of the touch screen system of FIG. 3. With collective reference to FIGS. 3-4, a plurality of single-layer leaf spring-arms 44 are attached alongside the touch lens 50, each being affixed directly to the touch lens 50 at both ends. Each leaf spring-arm 44 is also attached at its center directly to the underlying housing 20 by a set screw 46 threaded through both, effectively pulling the leaf spring-arm 44 down at the center into a concave arc. The spring bias preloads the touch lens 50 downward against the force sensors 30, effectively pre-loading the force sensors 30. The leaf spring-arm 44 is attached at its center to the underlying housing 20 by an adjustable set screw 46 threaded through aligned holes in both the spring-arm 44 and housing 20, the set screws 46 allowing manual preset and adjustment of the preload force applied to the sensors 30. Preferably, at least a pair of such leaf spring-arms 30 are used (as illustrated), each spaced beyond the width of the LCD display 55 and display support 10 so as to avoid obstruction, and each straddling one of two opposing sides of the touch lens 50 so as not to obscure the LCD display 55. Alternatively, four such leaf spring-arms 44 may be used, each straddling one of the four polygonal sides of the touch lens 50. The spring-arms 44 may be attached at each end to the underside of the touch lens 50 by rivets 42, grommets or other suitable attachment means.

Figure 5:
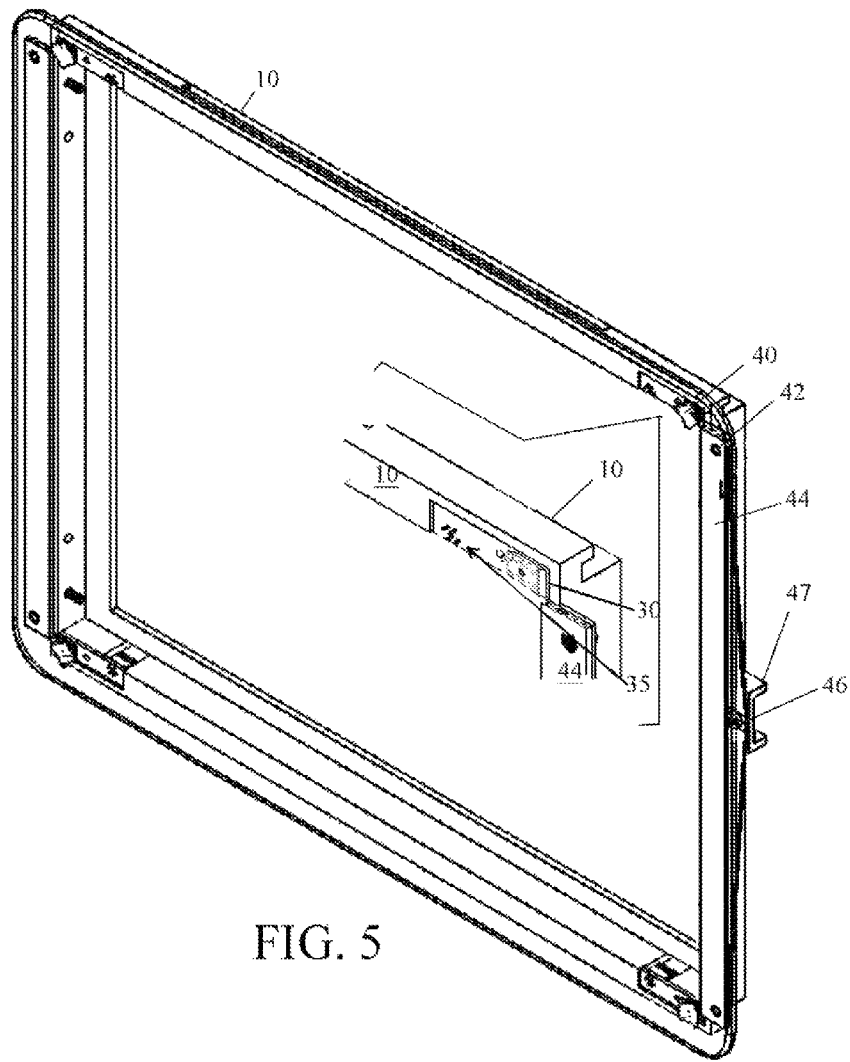
FIG. 5 is a side perspective view of another embodiment of the invention employing the above-mentioned HDK™ HFD-500 type force sensors (with integral steel ball).
Figure 6:
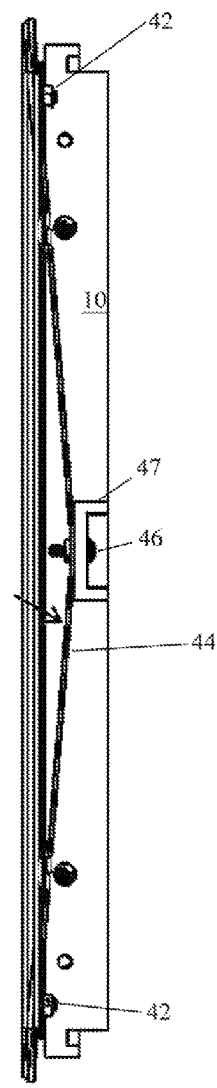
FIG. 6 is a side view of the embodiment of FIG. 5.

FIG. 5 is a side perspective view of another embodiment of the invention employing the above-mentioned HDK™ HFD-500 type force sensors (with integral steel ball), and FIG. 6 is a side view. As seen in the enlarged inset, each force sensor 30 is surface-mounted on the back of a small individual PCB 70 dedicated to that sensor. The PCB 70 is seated in a recess within the structural back plane of the display support 10, which also supports the LCD (omitted). Here the display support 10 is frame-shaped structure with a recessed frontal flange for seating the touch lens 50 (not shown but see FIG. 3) against the sensors 30, and a structural back plane behind the frontal flange for mounting the LCD. A pair of flat spring arms 44 is also fastened in the back plane of the display support 10, one on each side. In this implementation, the two ends of each of the two spring arms 44 may be fastened directly to the back side of the touch lens 50 using a strong adhesive such as UV cured epoxy or 3M adhesive tape (VHB). The two spring arms 44 retain a flat shape memory characteristic. Pre-loading of the spring arms 44 occurs as the center of the spring arms 44 are pulled rearward and secured, by screws 46 or the like, into anchor flanges 47 in the back plane. If desired, optional sensor protection may be employed such snap domes between the sensors 30 and the touch lens 50 and/or a structural dead-stop. For a disclosure of snap domes see U.S. patent application Ser. No. 13/369,808 for "SNAP DOMES AS SENSOR PROTECTION" filed Feb. 2, 2011). Note that the two spring arms 44 are dimensioned to carry the weight of the glass touch lens 50, and the deflection from the center screw is dimensioned to secure appropriate pre-loading of the spring arms 44.

Each leaf spring-arm 44 comprises a thin elongate length of suitable shape memory material that "remembers" its original, cold-forged shape. A low alloy, medium carbon steel or high carbon steel with very high yield strength, e.g., "spring steel" is acceptable. Spring-arms 44 cold forged of spring steel return to their original shape despite significant bending or twisting. The spring-arms 44 may be initially formed in a flat linear configuration. It is also possible to form spring-arms 44 as molded plastic springs, or even mold them as a part of the rear housing or other structural component.

The leaf spring-arms 44 bring the touch lens 50 into a fixed state in the xy-plane and resist translation there along, minimizing off-axis forces to the force sensors. However, the touch lens 50 remains free to float against the bias of the leaf spring-arm(s) 44 without any frictional physical contact along the z-axis. As further described below, this suspension assembly ensures friction-free or close to friction-free movement in the z-plane (ensuring that touch forces are transferred directly to the force sensors) while locking the lens in the xy-plane and thereby ensuring no movement or introduction of unknown forces to the system.

Spring-arms 44 each have a length l dimensioned to span a majority of the corresponding side of touch lens 50, and a width w and thickness t. The pre-bias applied by each spring-arm 44 to the corner-mounted sensors 30 can be determined based on the material modulus of elasticity E in combination with width w and thickness t using classical beam theory to calculate the deflection characteristics of the spring-arm 44. The pre-bias applied by each spring-arm 44 to the corner-mounted sensors 30 can be adjusted upward or downward by tightening or loosening set screw 46.

A vector component of the tightening force pulls the 4 corners of the lens 10 towards the backplane 20 and thereby provides the required pre-loading force against sensors 30.

Another vector component of the tightening force pulls each of two opposing corners of the touch lens 50 toward the center, such that two or more spring-arms 44 hold the touch lens 50 in place without any additional construction. Since incidental supporting features all tend to add unwanted friction forces, the present suspension eliminates this.

For a perfect mechanical construct where the lens 50 is resting perfectly on all the force sensors 30, there may still be a need for an additional pre-loading force. By adding a pre-loading force to the touch lens 50 that is greater than the weight of the touch lens 50, the lens 50 will remain in contact with the sensors 30 even if the device is held upside-down. The added pre-loading will also reduce mechanical interference and jitter.

The invention counteracts the interfering forces in a force-based touch screen device, minimizing them to the point that the software formulas start working with much higher accuracy. It also removes the need for an elaborate mounting mechanism for the touch lens 50, and eliminates the need for traditional pre-loading structure over the sensors 30, such as metal clamps pressing down on the touch lens 50. The above-described configuration better utilizes the elasticity of the leaf spring-arm 44 material to more evenly distribute forces. This in turn ensures a more uniform performance and force distribution, minimizes friction and other non-linear forces in the pre-loading and the xy-centering of the touch lens 50, and generally improves the accuracy of the total system.

In experiments with alternative mechanical solutions, it was observed that side movement introduced into the lens 50, such as when drawing a line, had a very negative impact on accuracy. The friction between the lens 50 and the user's finger drags the lens 50 in the direction of the finger movement and the lens is transferring a force both downwards as well as a side fore. Due to the nature of most available force sensors, the measured force must be applied directly (90 degree angle) into the sensor membrane. The side force from the dragging of the finger typically introduced an accuracy error between 0% and 10% of the total distance between the sensors. With the vector component of the preload applied to fixating the touch lens 50 in the xy-plane, the force in the xy-plane from the user's finger became less then 1% of the total pre-loaded force in the xy-plane, basically eliminating or filtering out the impact of the side force, ensuring that only the z-directional force is being measured.

One incidental benefit of the above improvement is that no other mounting structure is needed to support the lens 50 atop back plate 20, since the lens 50 is now suspended by the leaf spring arms 44. This reduces the mechanical height of the system and eliminates the number of components.

Another important aspect of the invention is that it can be mass-produced at a reasonable cost. Reviewing the description above, it should become clear that the only additional components to the system are the two-to-four leaf spring-arms 44, corresponding set screws 46, rivets 42, and sensor protection, such as one snap dome between the sensor and the touch plane as well as a structural dead-stop. For a disclosure of snap domes see U.S. patent application Ser. No. 13/369,808 for "SNAP DOMES AS SENSOR PROTECTION" filed Feb. 2, 2011. For high volume production, the leaf spring-arms 44 may be pre-attached to touch lens 50 at the two ends during production, and then pulled towards the back plate 20 (rear housing) in the middle and attached at set screws 46, creating a pre-loaded spring. Since material and lengths of the spring are known, the pre-loading force can be calculated and this will provide the length of the set screw 46, ensuring that no fine adjustment or calibration is required during production.

Another advantage of the innovation is that multiple materials may be used depending on the required spring characteristics. Smaller touch screens/touch pads may use a plastic spring, possibly molded as a part of the rear housing or other structural component.

It should now be apparent that the above-described embodiments all provide a mechanical suspension for a touch screen display/pad that does not add any additional non-linear forces to a touch screen system, provides frictionless translation ability along one axis, and yet requires components to be fully constrained along the other two axes.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A suspension for a touch screen display having a touch panel parallely-spaced from a fixed base panel, and a plurality of force sensors there between supported by said fixed based panel in a bearing relation to said touch panel, comprising:
   at least one elongate resilient leaf spring arm having a shape memory characteristic, said leaf spring arm being attached at both ends to one of said touch panel or base panel, and a center of said leaf spring-arm being attached to the other of said touch panel or base panel in an arcuate configuration, thereby pre-biasing said touch panel against said plurality of force sensors.

2. The suspension for a touch screen according to claim 1, wherein said at least one elongate resilient leaf spring arm comprises two elongate resilient leaf spring arms.

3. The suspension for a touch screen according to claim 2, wherein said at least one elongate resilient leaf spring arm comprises four elongate resilient leaf spring arms.

4. The suspension for a touch screen according to claim 1, wherein the center of said leaf spring-arm is attached to the base panel by an adjustable set screw.

5. The suspension for a touch screen according to claim 4, wherein the opposing ends of said leaf spring-arm are attached to the touch panel by fixed rivets.

6. The suspension for a touch screen according to claim 1, wherein the leaf spring-arm is cold-formed from spring steel with said shape memory characteristic.

7. The suspension for a touch screen according to claim 6, wherein the leaf spring-arm is cold-formed in a flat configuration from spring steel to provide said shape memory characteristic when deflected into an arched configuration.

8. The suspension for a touch screen according to claim 2, wherein the leaf spring-arms provide frictionless translation ability for said touch lens along a z-axis, while constraining relative lateral movement along an x-y plane.

9. The suspension for a touch screen according to claim 2, wherein said two elongate resilient leaf spring arm comprise plastic leaf spring arms.

10. A touch screen assembly for an electronic device, comprising:
    a touch lens having an underside;
    an LCD display parallely-spaced from said touch lens;
    a supporting substrate underlying said LCD display;
    a plurality of force sensors supported by said supporting substrate and bearing against the underside of said touch lens;
    at least two elongate resilient leaf spring arms having a shape memory characteristic, each of said leaf spring arms being attached at both ends to one side of said touch lens, and a center of said leaf spring-arm being attached to said supporting substrate so as to maintain each of said leaf spring arms in an arcuate configuration, thereby pre-biasing said touch panel against said plurality of force sensors.

11. The touch screen assembly for an electronic device according to claim 10, wherein said at least one elongate resilient leaf spring arm comprises four elongate resilient leaf spring arms.

12. The touch screen assembly for an electronic device according to claim 10, wherein the center of each leaf spring-arm is attached to the supporting substrate by an adjustable set screw.

13. The touch screen assembly for an electronic device according to claim 10, wherein said at least two elongate resilient leaf spring arms comprise four elongate resilient leaf spring arms.

14. The touch screen assembly for an electronic device according to claim 10, wherein the opposing ends of said leaf spring-arms is attached to the touch lens by fixed rivets.

15. The touch screen assembly for an electronic device according to claim 10, wherein each leaf spring-arm is cold-formed from spring steel with said shape memory characteristic.

16. The suspension for a touch screen according to claim 15, wherein each said leaf spring-arm is cold-formed in a flat configuration from spring steel to provide said shape memory characteristic when deflected into an arched configuration.

17. The suspension for a touch screen according to claim 10, wherein said at least two leaf spring-arms provide frictionless translation ability for said touch lens along a z-axis, while constraining relative lateral movement along an x-y plane.

18. A suspension for a touch screen display having a touch lens and LCD display both seated in a rigid supporting structure, and a plurality of force sensors fixedly attached to said supporting structure in a bearing relation to said touch lens, comprising:

a pair of opposing elongate resilient leaf spring arms having a flat shape memory characteristic, both leaf spring arms being attached lengthwise along opposing edges of said touch lens and attached at both ends to said touch lens, and a center point of said leaf spring-arms being biased outward and attached to said rigid supporting structure in an arcuate configuration, the shape-memory characteristic thereby pre-biasing said touch panel against said plurality of force sensors.

19. The suspension for a touch screen according to claim 18, wherein the centers of both of said pair of leaf spring-arms are attached to the supporting structure by adjustable set screws to vary said pre-bias.

20. The suspension for a touch screen according to claim 19, wherein the opposing ends of both of said pair of leaf spring-arms are adhesively bonded to the touch lens.

* * * * *